(12) United States Patent
Wakabayashi et al.

(10) Patent No.: US 9,778,435 B2
(45) Date of Patent: Oct. 3, 2017

(54) LENS BARREL

(71) Applicant: JCD (Guang Zhou) Optical Corporation Limited, Guangzhou (CN)

(72) Inventors: Hiroshi Wakabayashi, Guangzhou (CN); Takehiro Kano, Guangzhou (CN); Bo Chen, Guangzhou (CN)

(73) Assignee: JCD (Guang Zhou) Optical Corporation Limited, Guangzhou (CN)

( * ) Notice: Subject to any disclaimer, the term of this patent is extended or adjusted under 35 U.S.C. 154(b) by 72 days.

(21) Appl. No.: 13/893,585

(22) Filed: May 14, 2013

(65) Prior Publication Data

US 2014/0340771 A1 Nov. 20, 2014

(51) Int. Cl.
*G02B 7/02* (2006.01)

(52) U.S. Cl.
CPC .................................... *G02B 7/028* (2013.01)

(58) Field of Classification Search
CPC ........................................................ G02B 7/028
USPC .................................... 359/819–820, 703–704
See application file for complete search history.

(56) References Cited

U.S. PATENT DOCUMENTS

| 3,205,774 | A | * | 9/1965 | Estes | ...................... | G02B 7/022 |
| | | | | | | 359/789 |
| 5,557,474 | A | * | 9/1996 | McCrary | ...................... | 359/820 |
| 6,212,021 | B1 | | 4/2001 | Hase | | |
| 6,717,755 | B1 | * | 4/2004 | Katzman | ................ | G02B 7/028 |
| | | | | | | 359/820 |
| 2004/0184165 | A1 | * | 9/2004 | Hama et al. | ................... | 359/820 |

(Continued)

FOREIGN PATENT DOCUMENTS

| JP | 2003-185901 A | 7/2003 |
| WO | 2006/034957 A1 | 4/2006 |

OTHER PUBLICATIONS

Notice of First Office Action for Patent Application No. 201210033863.X, issued by The State Intellectual Property Office of People's Republic of China dated Mar. 16, 2016.

(Continued)

*Primary Examiner* — Thomas K Pham
*Assistant Examiner* — Sharrief Broome

(57) ABSTRACT

The present invention provides a lens barrel applicable to digital cameras, image pickup devices and cell phones. The lens barrel is small, low-cost and high-performance, and can suppress, by means of a simple mechanism provided in the lens barrel, a variation in the focal position of the lens barrel caused by the change in temperature. The lens barrel comprises a lens group consisting of a plurality of lenses and a lens chamber for holding the lens group. An elastic member is provided between a set of adjacent lenses of the lens group, for urging the set of adjacent lenses in an optical axis direction of the lenses. The space between the set of lenses is increased or decreased by the elastic member, which causes a back focus of the lens barrel to move in a direction opposite to the direction in which the focal position of the lens barrel varies due to thermal expansion or thermal contraction of the lens group and the lens chamber and the change of refractive index of the lens group resulting from a temperature change. Hence, by increasing or decreasing the space in the optical axis direction between the lenses at both ends of the elastic member, the variation in the focal position of the lens barrel is suppressed.

11 Claims, 5 Drawing Sheets

(56) References Cited

U.S. PATENT DOCUMENTS

| | | | |
|---|---|---|---|
| 2005/0232619 A1* | 10/2005 | Yamamoto | G02B 7/028 396/97 |
| 2008/0106796 A1* | 5/2008 | Kawada | 359/663 |
| 2011/0013926 A1* | 1/2011 | Yonehara | 399/94 |
| 2011/0188840 A1* | 8/2011 | Hwang et al. | 396/55 |
| 2012/0019905 A1* | 1/2012 | Teraoka | G02B 7/021 359/356 |

OTHER PUBLICATIONS

Notice of Second Office Action for Patent Application No. 201210033863.X, issued by The State Intellectual Property Office of People's Republic of China dated Oct. 17, 2016.

\* cited by examiner

LENS BARREL

FIELD OF THE INVENTION

The present invention relates to the field of optical products, and in particular relates to a small, low-cost and high-performance lens barrel.

DESCRIPTION OF THE RELATED ART

In the past, people were aware of the existence of the following problem: thermal expansion of the lens and the lens chamber and the change of the refractive index of the lens resulting from a temperature change cause the focal position of the lens barrel to change and thus deteriorates the optical property. In particular, when a part of the lens or the lens chamber is formed of plastic material, the thermal expansion and the change of refractive index become larger and the deterioration of the optical property becomes larger.

The problem of deterioration of the optical property can be solved by providing a mechanism (e.g. an automatic focusing mechanism) which suppresses a variation in the focal position of the lens barrel, but the size of the lens barrel will become bigger and the manufacturing cost will be increased. Furthermore, even if the lens barrel has an automatic zoom mechanism therein, when the focal position of the lens barrel varies as the temperature changes, the control range of the automatic focusing mechanism becomes larger, as a result, the increase in the size of the lens barrel is still inevitable As shown in FIG. 4 for example, the lens barrel consists of a plurality of lenses, a lens chamber and a plurality of spacers. The lenses are positioned in the optical axis direction by means of the spacers between the lenses, and are held between a pressing ring and the lens chamber. A is the back focus and P is the depth of focus. By means of a prescribed adjustment means, the lens barrel and the image sensor are positioned and fixed with respect to each other such that the image sensor surface is within the range of the depth P of focus of the lens barrel. In this state, as the temperature of the environment changes, the thermal expansion of the lens and the lens chamber and the change of the refractive index of the lens will occur, which causes the back focus A of the lens barrel to change and the image sensor surface to deviate from the range of the depth P of focus of the lens barrel. In this case, the optical property of the lens barrel deteriorates and the performance of the lens barrel at the normal temperature cannot be maintained.

In order to avoid deterioration of the optical property caused by the variation in the back focus of the lens barrel due to a temperature change of the environment, people consider using a lens barrel which has a mechanism (e.g. an automatic focusing mechanism) that can mechanically correct the back focus of the lens barrel and a relative position of the image sensor. However, such a mechanism will cause an increase in the size and the manufacturing cost of the lens barrel.

SUMMARY OF THE INVENTION

In view of the above problems existing in the old technology, the object of the present invention is to provide a small, low-cost and high-performance lens barrel.

A lens barrel according to a first technical solution of the present invention has the following structure: the lens barrel has a lens group consisting of a plurality of lenses, and a lens chamber for holding the lens group; an elastic member is provided between a set of adjacent lenses of the lens group, for urging the set of lenses in an optical axis direction of the set of lenses; the space between the set of lenses is increased or decreased by the elastic member, which causes the focal position of the lens barrel to move in a direction opposite to the direction in which the focal position of the lens barrel varies due to thermal expansion or contraction of the lens group and the lens chamber and the change of refractive index of the lens group resulting from a temperature change.

Hence, by increasing or decreasing the space in the optical axis direction between the lenses at both ends of the elastic member, the variation in the focal position of the lens barrel is suppressed, thereby solving the above problem.

A lens barrel according to a second technical solution of the present invention has the following structure: the linear expansion coefficient of the material of the lens chamber is greater than that of the lens group; and the distance between the lenses is adjusted by a difference value of the expansion or contraction amount between the lens chamber and the lens group resulting from a temperature change.

As long as the linear expansion coefficient of the material of the lens chamber is different from that of the lens group, two lenses at both ends of a compressed spring will be moved under the action of the compressed spring when temperature changes, causing the distance between the two lenses to be increased or shortened. By making the linear expansion coefficient of the material of the lens chamber greater than that of the lens group, the distance between the two lenses at both ends of the compressed spring can be increased or shortened in a direction that helps to cancel a variation in the back focus of the lens barrel caused by a variation in the refractive index of the lens resulting from a temperature change.

A lens barrel according to a third technical solution of the present invention has the following structure: the variation in the focal position of the lens barrel due to the variation in the distance between the lenses, is equal to or greater than the variation in the distance between the lenses.

That the variation in the focal position of the lens barrel is greater than (equal to or greater than) the variation in the distance between the lenses can suppress the influence produced by the variation in the focal position of the lens barrel caused by the variation in the refractive index of the lens when the temperature undergoes a big change.

A lens barrel according to a fourth technical solution of the present invention has the following structure: the lens chamber is formed of plastic material.

With the lens chamber formed of plastic material, the lens chamber can have an appropriate thermal expansion coefficient and thus can suppress the influence produced by the variation in the back focus of the lens barrel caused by the variation in the refractive index of the lens when the temperature changes.

A lens barrel according to a fifth technical solution of the present invention has the following structure: the lens group at least includes one or more plastic lenses.

That the lens group at least includes one or more plastic lenses makes it easy to set the thermal expansion coefficient of the entire lens group to be in coordination with the thermal expansion coefficient of the lens chamber so that it is possible to better suppress the influence produced by the variation in the back focus of the lens barrel caused by the variation in the refractive index of the lens when the temperature changes.

A lens barrel according to a sixth technical solution of the present invention has the following structure: a set of adjacent lenses are formed of materials having the same linear expansion coefficient and are fitted to each other in such a manner that they cannot be moved relative to each other in the radial direction thereof.

In a case that a set of adjacent lenses are formed of materials having the same linear expansion coefficient and are fitted to each other in such a manner that they cannot be moved relative to each other in the radial direction thereof, a core shift between the lenses in the radial direction caused by the variation in the distance between the lenses when the temperature changes can be suppressed.

DETAILED DESCRIPTION OF THE PREFERRED EMBODIMENTS

Figure 1:
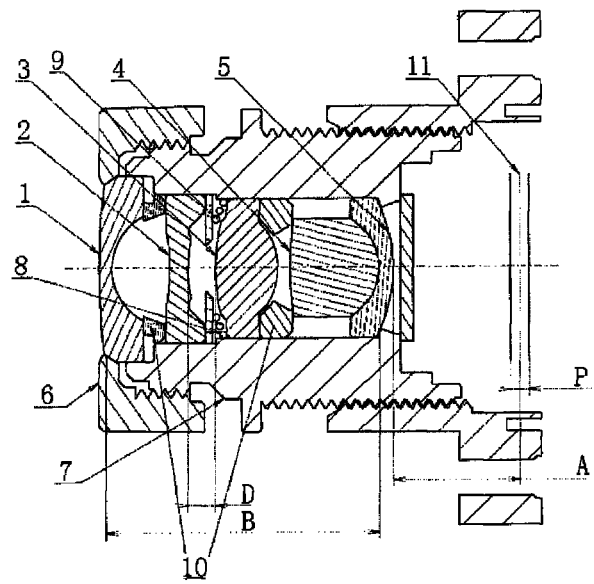
FIG. 1 is a longitudinal sectional view showing the structure of a lens barrel of the present invention.
Figure 2:
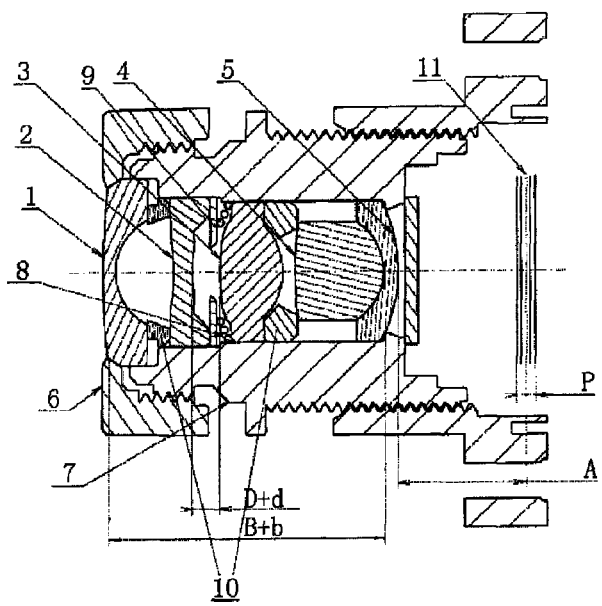
FIG. 2 is a longitudinal sectional view showing how the lens barrel of the present invention corrects a variation in the back focus caused by a temperature change.
Figure 3:
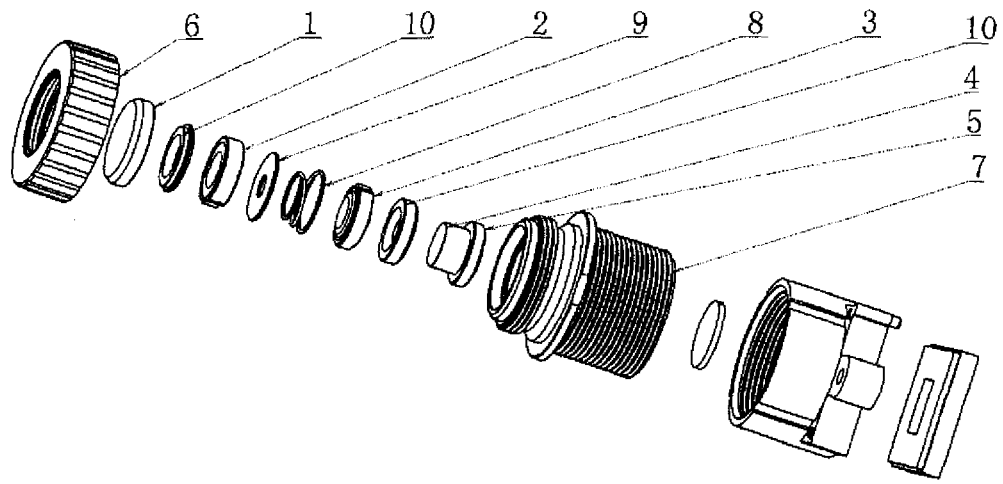
FIG. 3 is an exploded perspective view showing the structure of a single focus lens barrel of the present invention.
Figure 4:
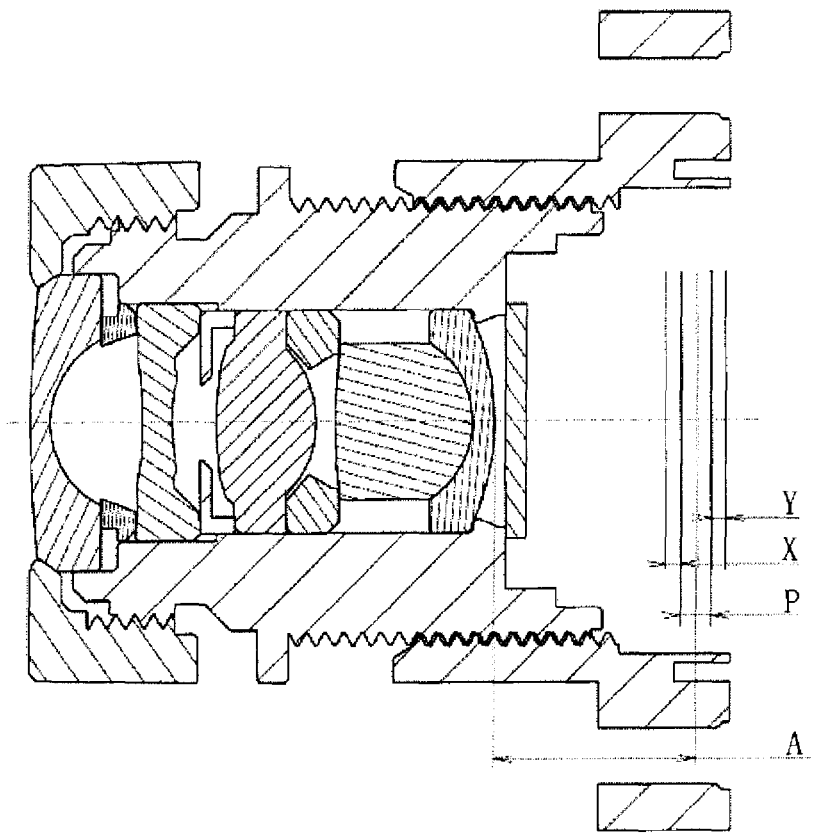
FIG. 4 is a longitudinal sectional view showing the structure of a single focus lens barrel of the past.
Figure 5:
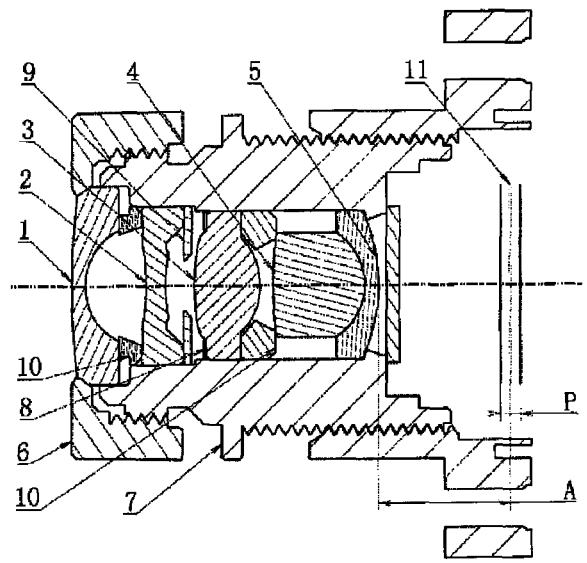
FIG. 5 is a longitudinal sectional view showing the structure of a lens barrel according to another embodiment of the present invention.
Figure 6:
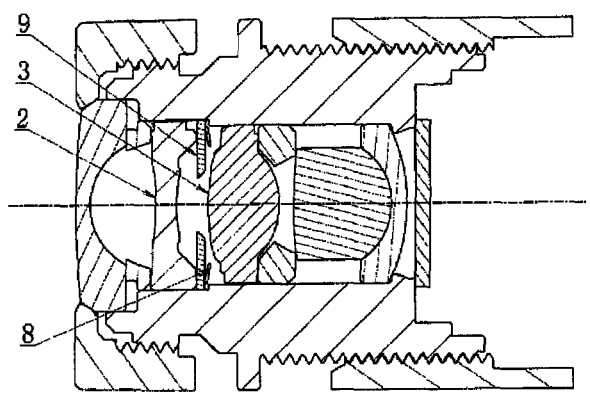
FIG. 6 is a longitudinal sectional view of the lens barrel in FIG. 5 after the lens barrel rotates 90° around the axial direction.
Figure 7:
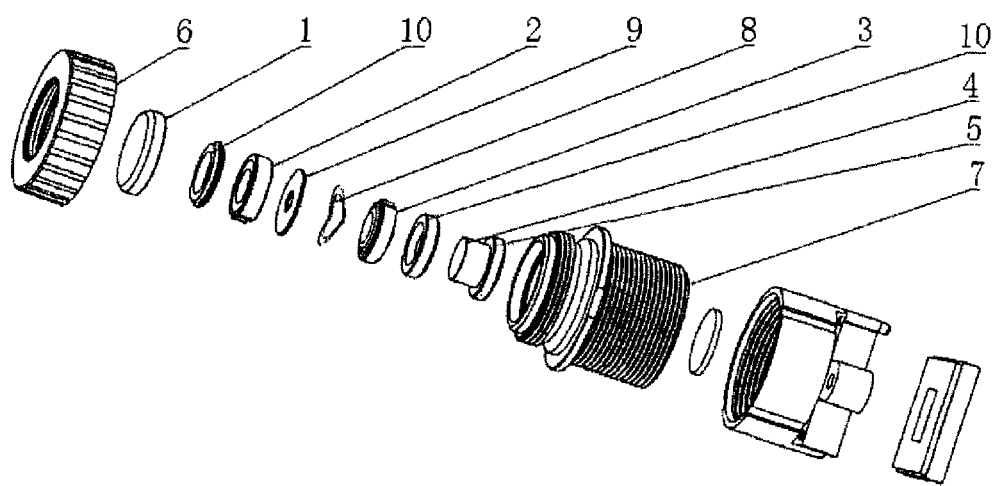
FIG. 7 is an exploded perspective view showing the structure of the lens barrel in FIG. 5.
Figure 8:
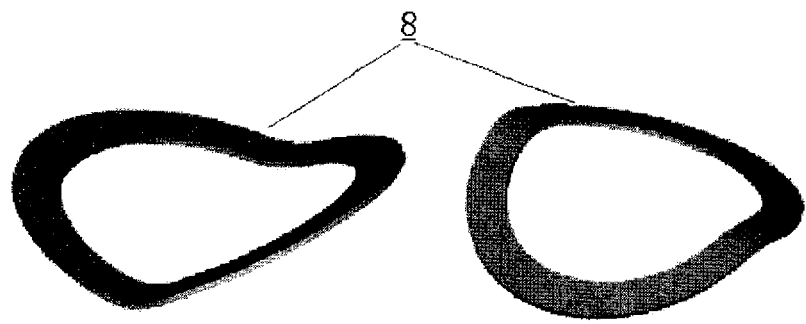
FIG. 8 is an enlarged schematic view of a spring of the lens barrel in FIG. 5.

A first embodiment of the present invention will be described with reference to FIGS. 1 and 2.

A lens barrel of the present invention comprises: a plastic pressing ring 6, a plastic lens chamber 7, $1^{st}$-$5^{th}$ lenses 1-5 held in the plastic lens chamber 7, a compressed spring 8 disposed between the second lens 2 and the third lens 3 for urging in a direction such that the second lens 2 and the third lens 3 are separated from each other in opposite directions, a parallel spacer 9, and spacers 10 for positioning two adjacent sets of lenses in the optical axis direction. The lens groups 1-5 and the spacers 10 are urged by the compressed spring 8 in the optical axis direction so as to receive appropriate load pressures. The plastic lens chamber 7, the plastic pressing ring 6, the lens groups 1-5 and the spacers 10 have different linear expansion coefficients. As the temperature changes, the size of each component changes to accumulate to form a difference value. Under the action of the compressed spring 8, the distance between the second lens 2 and the third lens 3 in the optical axis direction is changed.

In the above-described lens barrel, the back focus A is most sensitive to the change of the distance between the second lens 2 and the third lens 3 in the optical axis direction. In other words, the above-described lens barrel can be divided into two parts: the $1^{st}$-$2^{nd}$ lenses 1-2 and the $3^{rd}$-$5^{th}$ lenses 3-5, with the compressed spring 8 therebetween. As the temperature changes, the size of each component changes to accumulate to form a difference value, and the distance between the second lens 2 and the third lens 3 can be effectively increased or decreased under the action of the compressed spring 8.

The lens barrel of the present invention makes an adjustment to the back focus as the final assembling process at normal temperature, so as to obtain excellent optical property. A method of correcting back focus variation of the lens barrel caused by a temperature change with respect to the normal temperature will be described with reference to FIGS. 1 and 2.

The lens barrel and the image sensor are positioned and fixed with respect to each other by means of a prescribed adjustment means at normal temperature such that the image sensor surface 11 is within the range of the depth P of focus of the lens barrel. As shown in FIG. 1, at normal temperature, the distance between the second lens 2 and the third lens 3 in the optical axis direction is D, the length of the plastic lens chamber 7 in the optical axis direction is B, and the image sensor surface 11 is within the range of the depth P of focus of the lens barrel. In this state, once the temperature changes, the thermal expansion coefficients of the lenses 1-5 and the plastic lens chamber 7 and the refractive indexes of the lenses 1-5 will change, which causes a back focus A of the lens barrel to change. At this time, if no correction is made and the image sensor surface 11 deviates from the range of the depth P of focus of the lens barrel, the optical property of the lens barrel will deteriorate; in other words, the performance of the lens barrel at normal temperature cannot be maintained.

Even if the temperature changes to a temperature different from the normal temperature, the lens barrel of the present invention will not be affected by the temperature change and its performance at normal temperature can be maintained. The lens barrel of the present invention corrects back focus variation of the lens barrel based on the linear expansion coefficient of the material. Assuming that the size variation of the plastic lens chamber 7 is $b=B*\alpha_{LH}*\Delta t$ when the linear expansion coefficient of the plastic lens chamber 7 is $\alpha_{LH}$ and the temperature variation of the plastic lens chamber 7 is $\Delta t$. On the other hand, assuming that the size variation of the respective lenses 1-5 is $c_{Li}=C_{Li}*\alpha_{Li}*\Delta t$ when the linear expansion coefficient of the respective lenses 1-5 is $\alpha_{Li}$ (i=1, 2, . . . ), the size of the respective lenses 1-5 in the optical axis direction is $C_{Li}$ (i=1, 2, . . . ) and the temperature variation of the respective lenses 1-5 is $\Delta t$, and assuming that the size variation of the respective spacers 10 is $e_{si}=E_{Si}*\alpha_{Si}*\Delta\Delta t$ when the linear expansion coefficient of the respective spacers 10 is $\alpha_{Si}$ (i=1, 2, . . . ), the size of the respective spacers 10 in the optical axis direction is $E_{Si}$ (i=1, 2, . . . ) and the temperature variation of the respective spacers 10 is $\Delta t$, the accumulated total of the above size variations is $\Sigma(c_{Li}+e_{Si})$. If the relationship between the linear expansion coefficient of the plastic lens chamber 7 and the linear expansion coefficient of the lenses 1-5 is $\alpha_{LH} \gg \alpha_{Li}$ and the relationship between the linear expansion coefficient of the plastic lens chamber 7 and the linear expansion coefficient of the spacers 10 is $\alpha_{LH} \gg \alpha_{Si}$, the relationship between the size variation of the plastic lens chamber 7 and the size variations of the lenses 1-5 and the spacers 10 is $b > \Sigma(c_{Li}+e_{Si})$.

In the lens barrel of the present invention, a variation tendency of the distance between the second lens 2 and the third lens 3 is contrary to a variation tendency of the back focus A of the lens barrel. That is, once the distance between the second lens 2 and the third lens 3 increases, the back focus A of the lens barrel is shortened; and once the distance between the second lens 2 and the third lens 3 decreases, the back focus A of the lens barrel is lengthened.

An explanation will be made as to the method of correcting the back focus of the lens barrel, in the case where the temperature changes from the normal temperature to a high temperature. In the lens barrel of the present invention, the second and the third lenses 2 and 3 are formed of plastic material. As the refractive index of the plastic lenses varies greatly at different temperatures, the temperature change exerts the greatest influence on the variation in the back focus. In this situation, once the temperature is high, the refractive index of the second and the third lenses 2 and 3 will change, causing the back focus A of the lens barrel to become longer. Although the refractive index of other lenses (glass lenses) also changes at this time, because the refractive index change of glass lenses makes very little influence on the back focus A compared to the refractive index change of the plastic lenses, the explanation thereof is omitted.

At a high temperature, the plastic lens chamber 7, the lenses 1-5 and the spacers 10 of the lens barrel expand at the same time and respectively undergo the above-mentioned size variations b and $\Sigma(c_{Li}+e_{Si})$.

As stated above, the lens barrel of the present invention is divided into two parts: the $1^{st}$-$2^{nd}$ lenses 1-2 and the $3^{rd}$-$5^{th}$ lenses 3-5, with the compressed spring 8 therebetween, the compressed spring 8 urges the second and the third lenses 2 and 3 in such a direction that these two lenses become distant from each other. Thus, based on an accumulated size difference $d=b-\Sigma(c_{Li}+e_{Si})$ generated by the expansion of the plastic lens chamber 7, the lenses 1-5 and the spacers 10, the distance between the second and the third lenses 2 and 3 is increased and the back focus A of the lens barrel is shortened.

Therefore, at a high temperature, the part of the back focus A of the lens barrel, which becomes longer due to a change of the refractive index of the second and the third lenses 2 and 3, is corrected by increasing the distance between the second and the third lenses 2 and 3 on the basis of the accumulated size difference generated by the expansion of the plastic lens chamber 7, the lenses 1-5 and the spacers 10, thereby suppressing a variation in the back focus A. Further, at a low temperature, the change of the refractive index of the second and the third lenses 2 and 3 and the change of the distance between the second and the third lenses 2 and 3 can achieve the same effect by means of an action reverse to the above action at the high temperature.

To make a further generalization, the contraction or expansion amount of the size of each component caused by a temperature change is quite little, however, with respect to the change in the entire length B of the lens barrel, the variation in the back focus A of the lens barrel is dealt with by increasing or decreasing the space between the second and the third lenses 2 and 3. The optical system is designed such that a variation in the back focus A can be realized by means of a change in the space between the second and the third lenses 2 and 3, thereby, a variation in the back focus A caused by a temperature change can be effectively corrected.

A brief explanation of the change of the refractive index of the lens will be made here. The material of the lens has a property that the refractive index of the lens becomes smaller when the temperature increases and becomes greater when the temperature decreases. The sensitivity of the refractive index about the temperature varies with the material of the lens. In particular, the refractive index of the plastic lens is very sensitive to temperature, so the influence of the temperature change on the back focus is great.

The second and the third lenses 2 and 3 in the lens barrel of the present invention are plastic lenses. The second lens 2 has negative refractive power, so the back focus becomes shorter/longer upon an increase/a decrease in temperature. Further, the third lens 3 has positive refractive power, so the back focus becomes longer/shorter upon an increase/a decrease in temperature. As an absolute value of the refractive power of the second lens 2 is smaller than that of the third lens 3, the back focus A of the lens barrel of the present invention becomes longer as the temperature increases and becomes shorter as the temperature decreases.

Furthermore, as stated above, the sensitivity of the refractive index of the lens about the temperature varies with the material of the lens, so it is possible to reduce the influence of the temperature on the variation in the back focus A of the lens barrel by making the second lens 2 from a material which has a refractive index more sensitive to the temperature than the refractive index of the material of the third lens 3.

Thus, if this method is combined with the aforementioned method in which the back focus variation is reduced by changing the space between the lenses using the thermal expansion or contraction of the lens chamber, it is possible to suppress the variation in the back focus very effectively regarding a temperature change of a wider range.

The following is a description of a second embodiment of the present invention with reference to FIGS. 5-8. For the components whose functions in the second embodiment are the same as those in the first embodiment, the same reference signs are used, and detailed descriptions of these components will not be given unless there is such a need.

The second embodiment is the same as the first embodiment, expect that the compressed spring 8 is replaced by a circular plate spring 8. By employing the plate spring 8 which is thinner than the compressed spring 8 (coil spring) in the first embodiment, the space in the optical axis direction can be reduced and thus downsizing of the lens barrel can be further achieved.

Figure 9:
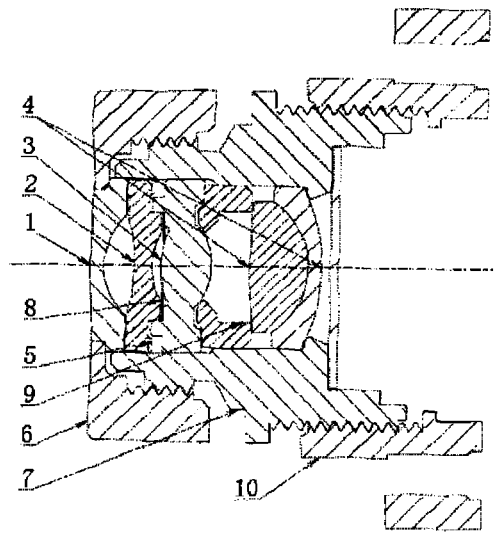
FIG. 9 is a longitudinal sectional view showing the structure of a lens barrel according to another embodiment of the present invention.
Figure 10:
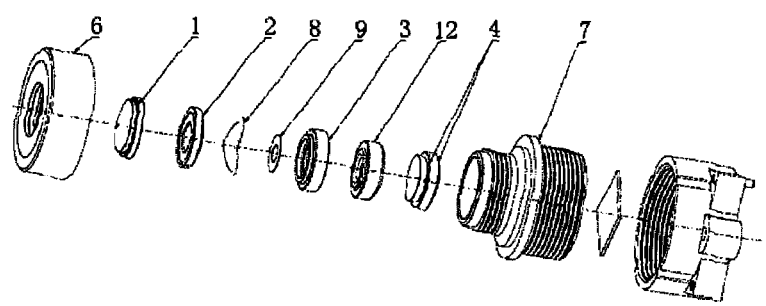
FIG. 10 is an exploded perspective view showing the structure of the lens barrel in FIG. 9.

The following is a description of a third embodiment of the present invention with reference to FIGS. 9 and 10. For the components whose functions in the third embodiment are the same as those in the second embodiment, the same reference signs are used, and detailed descriptions of these components will not be given unless there is such a need.

In the third embodiment, the second and the third lenses 2 and 3, which are formed of plastic materials having the same or substantially the same linear expansion coefficient, have a structure of fitting into each other at an outer side of the plate spring 8, such that the second and the third lenses 2 and 3 cannot be moved relative to each other in the radial direction thereof. When only the first and the second embodiments are adopted, although a variation in the focal position of the lens barrel can be effectively suppressed by increasing or decreasing the space between the second and the third lenses 2 and 3 in the optical axis direction, a core shift phenomenon between the lenses caused by a change in the sizes of the lenses in the radial direction due to a temperature change may be inevitable. However, with the fitting structure in the third embodiment, the second and the third lenses 2 and 3 are held in such a manner that they cannot be moved relative to each other in the radial direction thereof, so the above-mentioned core shift phenomenon can be effectively avoided. There is no particular limitation as to how the second and the third lenses 2 and 3 are fitted into each other, as long as it can be guaranteed that the second and the third lenses 2 and 3 cannot be moved relative to each other in the radial direction thereof. Furthermore, in the third embodiment, the location of the parallel spacer 9 is changed and a sixth lens 12 is added, but these are mere modifications that are made according to the actual situation of the product and make no direct impact on the above effect of the third embodiment.

To sum up, the lens barrel of the present invention does not need any mechanism that mechanically corrects the back focus of the lens barrel and a relative position of the image sensor, so it can effectively suppress a variation in the back focus of the lens barrel at different temperatures and can thereby maintain excellent optical property, without causing an increase in the size and the cost of the lens barrel.

Effects of Application in Industry

The present invention is a photographing lens barrel that can be used in cameras, video cameras and cell phones.

The invention claimed is:

1. A lens barrel, comprising:
a lens group consisting of a plurality of lenses;
an elastic member provided between a set of adjacent lenses of the lens group, the elastic member constantly forcing the set of lenses apart in an optical axis direction of the set of lenses;
a lens chamber for holding the lens group and regulating a distance between the set of lenses by balancing the force of the elastic member in the optical axis direction of the set of the lenses; and
at least one substantially rigid spacer within the lens chamber,
wherein the lens chamber has a length and a coefficient of linear thermal expansion such that as the temperature changes, the distance between the set of lenses forced apart by the elastic member is increased or decreased to maintain a focal position of the lens barrel despite thermal expansion or contraction of the lens group and the lens chamber and/or the change of refractive index of the lens group resulting from a temperature change, and
wherein among the plurality of lenses, the lens chamber, the at least one spacer, and the elastic member, only the elastic member undergoes substantial elastic deformation in response to the temperature change.

2. The lens barrel according to claim 1, wherein
a linear expansion coefficient of a material of the lens chamber is greater than that of the lens group, and
the distance between the lenses is adjusted by a difference value of expansion or contraction amount between the lens chamber and the lens group resulting from a temperature change.

3. The lens barrel according to claim 1, wherein each spacer has a length and a coefficient of linear thermal expansion such that as the temperature changes, the distance between the set of lenses forced apart by the elastic member is increased or decreased to maintain the focal position of the lens barrel despite thermal expansion or contraction of the lens group and the lens chamber and/or the change of refractive index of the lens group resulting from the temperature change.

4. A lens barrel comprising:
a lens group consisting of a plurality of lenses;
an elastic member provided between a set of adjacent lenses of the lens group, the elastic member constantly forcing the set of lenses apart in an optical axis direction of the set of lenses; and a lens chamber for holding the lens group and regulating a distance between the set of lenses by balancing the force of the elastic member in the optical axis direction of the set of the lenses;
wherein the linear expansion coefficient of the lens chamber $\alpha_{LH}$ is determined according to a formula:

$$\alpha_{LH} = \frac{d + \sum_{i=1}^{L}(C_{Li}\alpha_{Li}\Delta_T) + \sum_{i=1}^{S}(E_{Si}\alpha_{Si}\Delta_T)}{B\Delta_T};$$

wherein L is the number of lenses among the plurality of lenses, $C_{Li}$ is the thickness of each lens, $\alpha_{Li}$ is the linear expansion coefficient of each lens, S is the number of spacers in the lens chamber, $E_{Si}$ is the thickness of each spacer, $\alpha_{Si}$ is the linear expansion coefficient of each spacer, B is the length of the lens chamber, $\Delta_T$ is a change in temperature, and d is a change in distance between the adjacent lenses required to maintain the focal position due to the variation in refractive index resulting from the change in temperature $\Delta_T$; and
wherein the lens chamber has a length and a coefficient of linear thermal expansion such that as the temperature changes, the distance between the set of lenses forced apart by the elastic member is increased or decreased to maintain a focal position of the lens barrel despite thermal expansion or contraction of the lens group and the lens chamber and/or the change of refractive index of the lens group resulting from a temperature change.

5. The lens barrel according to claim 4 wherein a variation in the focal position of the lens barrel due to a variation in the distance between the lenses, is equal to or greater than the variation in the distance between the lenses.

6. The lens barrel according to claim 5, wherein the lens chamber is formed of plastic material.

7. The lens barrel according to claim 6, wherein the lens group at least includes one or more plastic lenses.

8. The lens barrel according to claim 7, wherein the variation in the focal position of the lens barrel due to the variation in the distance between the lenses, is equal to an opposite variation in the focal position of the lens barrel due to a variation in refractive index resulting from the temperature change.

9. A device comprising:
a plurality of lenses aligned along an optical axis, the plurality of lenses including two adjacent lenses having a separation distance D, each lens having a thickness $C_{Li}$ and a linear expansion coefficient $\alpha_{Li}$;
a lens chamber surrounding the plurality of lenses, the lens chamber having a length B and a linear expansion coefficient $\alpha_{LH}$;
at least one substantially rigid spacer within the lens chamber having a thickness $E_{Si}$ and a linear expansion coefficient $\alpha_{Si}$; and
a spring between the two adjacent lenses, the spring applying a force along the optical axis to each of the two adjacent lenses and maintaining compression along the optical axis of the plurality of lenses and the at least one spacer within the lens chamber;
wherein the lens chamber regulates the separation distance D by balancing the force along the optical axis applied by the spring to each of the two adjacent lenses;
wherein the length B and linear expansion coefficient $\alpha_{LH}$ of the lens chamber is such that the separation distance D changes by an amount d due a change in temperature $\Delta_T$ according to a formula $$d = B\alpha_{LH}\Delta_T - \sum_{i=1}^{L}(C_{Li}\alpha_{Li}\Delta_T) - \sum_{i=1}^{S}(E_{Si}\alpha_{Si}\Delta_T);$$

wherein L is the number of lenses and S is the number of spacers; and wherein changing the separation distance by the amount d compensates for a change in refractive index of the plurality of lenses due to the change in temperature $\Delta_T$, thereby maintaining the focal position.

10. The device according to claim 9, further comprising an image sensor positioned at the focal position;

wherein the focal position is maintained on the image sensor despite the change in temperature $\Delta_T$.

11. The device according to claim 9, wherein among the plurality of lenses, the lens chamber, the at least one spacer, and the spring, only the spring undergoes substantial elastic deformation in response to the change in temperature $\Delta_T$.

\* \* \* \* \*